United States Patent [19]
Frank

[11] Patent Number: 5,628,958
[45] Date of Patent: May 13, 1997

[54] MELT SHOP LAYOUT

[75] Inventor: William R. Frank, Bettendorf, Iowa

[73] Assignee: IPSCO Enterprises Inc., Wilmington, Del.

[21] Appl. No.: 465,396

[22] Filed: Jun. 5, 1995

Related U.S. Application Data

[63] Continuation-in-part of Ser. No. 351,693, Dec. 8, 1994, abandoned.

[51] Int. Cl.$^6$ ............................................. C21B 7/00
[52] U.S. Cl. ........................... 266/143; 266/901; 373/78
[58] Field of Search ........................... 266/142, 143, 266/155, 157, 901; 373/78; 75/10.1; 164/417, 337, 335

[56] References Cited

U.S. PATENT DOCUMENTS

| | | | |
|---|---|---|---|
| 2,355,095 | 8/1944 | Moore | 373/78 |
| 3,439,909 | 4/1969 | Richards | 373/78 |
| 3,612,739 | 10/1971 | Korneff | 373/78 |
| 3,612,740 | 10/1971 | Gierek | 373/78 |
| 3,791,636 | 2/1974 | Anderson | 266/143 |
| 3,913,898 | 10/1975 | Wolters | 373/78 |
| 4,319,921 | 3/1982 | Pryor et al. | 266/156 |
| 4,460,164 | 7/1984 | Tirelius | 266/158 |
| 4,740,989 | 4/1988 | Steipe | 373/78 |
| 4,978,105 | 12/1990 | Meierling | 266/143 |
| 5,203,909 | 4/1993 | Petrushka et al. | 75/375 |
| 5,204,873 | 4/1993 | Imagawa | 373/78 |
| 5,263,690 | 11/1993 | Wolters et al. | 266/159 |

*Primary Examiner*—Scott Kastler
*Attorney, Agent, or Firm*—Robert H. Barrigar; Barrigar & Moss

[57] ABSTRACT

A melt shop for melting scrap steel comprises a pair of primary melting furnaces and a pair of refining facility stations. The layout for the primary melting furnaces, refining facility, associated support, and peripheral equipment and caster is a single-aisle layout with general longitudinal alignment of the major constituent elements. Scrap delivery to the primary melt furnaces may comprise trackways running perpendicular to the longitudinal layout, the discharge end of each trackway being proximate to a primary melt furnace. A single trackway is preferably provided for a pair of overhead cranes running longitudinally from the caster to the primary melt furnaces.

11 Claims, 5 Drawing Sheets

MELT SHOP LAYOUT

RELATED APPLICATION

This is a continuation-in-part of U.S. patent application Ser. No. 08/351,693, filed on Dec. 8, 1994, now abandoned.

FIELD OF INVENTION

This invention relates to a melting facility for a steel mill of the type that accepts scrap iron and steel as an input, and produces molten steel ready for continuous casting as an output. In particular, this invention relates to a preferred melt shop layout.

BACKGROUND INFORMATION

Conventionally, a melting facility in a steel mill that accepts scrap iron and steel as an input and produces molten steel ready for casting in a continuous caster as an output (frequently referred to in the industry as a "melt shop") includes at least one and frequently two or more primary melting furnaces of the electric arc type, at least one and frequently two or more refining facility stations, and an overall excess capacity in order that a continuous supply of molten steel can be provided to the caster. If the rolling facility downstream of the caster is designed to operate with only a standard width (and thickness) of casting—in other words, if the production rate of steel output per hour is constant—then it is a fairly simple task to design a melt shop that will supply just enough steel to keep the caster fully supplied (with a slight overcapacity to provide a margin of error). However, most steel mills are required to produce cast slabs of variable widths—in a contemporary facility, typically anywhere from 4 ft. wide to 10 ft. wide or wider. This requirement presents the problem that if the melt shop is designed to supply a continuous supply of molten steel for a long sequence of casting (say) 10-ft.-wide castings, then it will necessarily have a large overcapacity when producing, say, 4-ft.-wide steel castings. This overcapacity is typically provided at the expense of a significantly higher capital outlay than would be needed if standard-width castings only were produced, and higher capital costs lead to higher steel prices.

As steel pricing becomes increasingly competitive, it is highly desirable to reduce the capital costs associated with any equipment used in the steel mill. The capital cost associated with melt shop furnaces and associated equipment is significantly high.

Capital cost also can be higher than necessary if the melt shop takes more plant room than necessary, especially if an inefficient layout requires more or larger peripheral or support equipment (exhaust arrangements, cranes, etc.) than would be necessary for a compact and efficient layout.

Associated with the primary melting furnace in melt shops of the type under discussion are scrap bucket delivery means, charging means, and ladle transfer means. The scrap bucket delivery means is conventionally a car movable along a trackway, the scrap bucket being carried on the car from a loading area external to the melt shop into the melt shop to a bucket unloading position in the vicinity of the primary melt furnace. The charging means includes an overhead hoist or crane—the bucket is then hoisted by the overhead crane and its scrap contents are dumped into the furnace to charge it. The ladle transfer means is typically a car movable along a trackway running from the tapping position underneath and proximate to the primary melting furnace to a holding position outside the primary melt area from which the ladle filled with molten steel may be conveyed by an overhead crane or other suitable conveyor to the refining facility.

Ladles are pre-heated by a gas-fired burner, at a ladle pre-heating station, before being passed to the primary melt furnace for filling.

It is conventional that after primary melting, ladles full of molten steel will be passed directly to one or more refining facility stations for metallurgical treatment and passed thereafter to the caster. The term "refining facility" is used herein to refer to what in the industry is usually called an "LMF" or "ladle metallurgical facility (furnace)". The refining facility is the secondary heating facility used for adding small amounts of metallurgical agents to a ladle of molten steel, bubbling with argon gas, and stirring, as well as heating to a desired casting or holding temperature. If two such refining facility stations are used, the caster accepts ladles first from one refining station and then the other so as to obtain a continuous supply of steel. The refining may be done in two stages at the refining facility in a first stage, heating and argon bubbling may occur, and in a second stage, metallurgical agents may be added and the metal may be stirred to obtain uniform consistency. Normally, the electrode set is removed before the second stage begins.

Generally speaking, conventional primary scrap melting furnaces and refining facilities are each provided with a discrete electrode, or set of electrodes at least in the case of the refining facility, which latter typically operates on 3-phase alternating current.

Molten steel produced by the primary melt furnace is conventionally poured into a ladle that is then transported to the ladle finishing and refining facility. Direct current is unsuitable for use in the refining facility arrangement, because there normally cannot be a bottom electrode in a ladle. Typically, a trio of AC electrodes are used in a three-phase AC installation for providing electrical energy to the ladles in the refining facility.

To ease the refining requirement in the refining facility, it is desirable to provide a supply of alloying agents in bulk for introduction into the primary melting furnaces. This enables the primary melt to attain roughly the metallurgical composition desired for the melt. At the refining stage, trim alloys may be supplied in smaller quantities to bring the final composition of the melt to that desired.

Continuous casting cannot be carried on indefinitely—there is the necessity of shutting down the melt shop and the caster from time-to-time in dependence upon the satisfaction of a series of orders for varying quantities of product of various dimensions, and to perform maintenance and repair operations. As far as possible, however, it is desirable to be able to conduct maintenance and repair operations without any more down-time than is necessary. It is desirable to design the melt shop to be able to provide a continuous supply of molten steel to the caster for as long as required to fulfil the order at hand, or until failure of the submerged entry nozzle from the tundish into the caster mold. This may require several hours of continuous casting, and the melt shop must be able to generate the required supply.

Furthermore, energy consumption in the melt shop tends to be significantly higher than energy consumption in any other part of a steel mill. The cost of electrical energy depends not only upon the average amount of energy consumed over a period of time, but also upon the peak energy load required from time-to-time. In a typical melt shop for melting scrap, both electricity and natural gas are consumed. Electricity is consumed for the primary melting furnaces and the refining facility, and, of course, for associated blowing and pumping equipment. Natural gas is consumed to provide auxiliary heating of scrap in the primary melt furnace to provide pre-heating of ladles etc. Again, to the extent that energy expense can be reduced, the output of a steel mill can be priced competitively.

In order that a conventional melt shop be designed to match the output of the primary melting furnace(s) to the output of the ladle metallurgical refining facility, consideration has to be given to the differing lengths of time during which each type of equipment operates to perform its intended function. It will be found that the time required to perform the primary melt for a given tonnage of steel provided to fill a ladle, will exceed by a considerable margin the time required to perform the metallurgical refining, heating of the ladle contents to casting temperature, and superheating the ladle if need be. This means that there tends to be an inherent imbalance between the output of the primary melting furnaces and the refining facility that must be accommodated to permit an appropriate continuous supply of molten metal to be provided to the caster for continuous casting. One way of dealing with the imbalance is to provide a higher primary melt capacity than refining facility capacity so that the total capacity of the primary melting furnaces in tons per hour is at least approximately matched to the total capacity of the refining facility in tons per hour. This approach to melt shop design is satisfactory from the point of view of balancing the output of both the primary furnaces and refining facility, but if widely differing slab widths must be produced in the mill, the excess capacity either in the number of furnaces or in the designed tonnage capacity of furnaces adds significantly to the capital cost of constructing the melt shop.

SUMMARY OF THE INVENTION

According to the present invention, in a melt shop for a steel mill, at least two primary melting furnaces (here meaning at least two refractory shells for melting charges of solid metal, typically scrap metal) and at least two refining facility stations are provided. For most installations it is expected that each of the primary melting furnaces should preferably be a DC melt furnace provided with a single consumable graphite electrode, but for various reasons some designers may prefer to provide an AC primary melt furnace instead of a DC primary melt furnace. The principles of the present invention may be applied regardless of the choice of AC or DC for the primary melt furnace.

At least two refining facility stations located downstream of the primary melting furnaces complement the two primary melting furnaces. (In this specification, the terms "upstream" and "downstream" are used relative to the sequence of process steps, so that scrap input to the primary melting furnaces is the most upstream event, and delivery of molten steel to the tundish at the caster is the most downstream event in the melt shop. Equipment should preferably be located so that the required sequence of process steps occurs within the least distance conveniently possible, which implies that equipment should be arrayed in orderly fashion from upstream to downstream to minimize transit, etc.)

Specifically, according to one aspect of the invention, a melting facility (melt shop) for a steel mill of the type that accepts scrap iron and steel as an input and a caster taking as an input the molten steel output of the melting facility, comprises, in longitudinally extending and spaced array, at least a pair of electric arc primary melting furnaces and a ladle metallurgical refining facility having at least a pair of operating stations, the furnaces being arranged in a longitudinally extending single-aisle layout, the caster being located in the vicinity of the downstream end of the single-aisle layout and the cast slab output of the caster extending generally perpendicular to the single-aisle layout. Preferably the caster tundish is generally longitudinally aligned with the single-aisle layout of the melting shop.

The melt shop preferably additionally includes ladle transfer means such as a transfer car operating on a trackway for positioning a ladle selectably underneath the outlet port of each of the primary melting furnaces or to a holding station downstream of the primary melting furnaces, but upstream of the ladle metallurgical refining facility. A ladle stocking station is preferably maintained in the vicinity of the ladle metallurgical refining facility. At least one overhead crane transversely bracketing the furnaces and the refining facility is capable of longitudinal movement along the single-aisle layout of the melting facility. Two such overhead cranes are preferred, preferably working on a common trackway.

The primary melt facility is preferably atmospherically separated from the remaining portion of the melting facility by a barrier wall, as is conventional. An exhaust venting system for the primary melting furnaces should be provided, as is conventional. The holding station for the ladle transfer means is preferably located downstream of and outside of the primary melt area.

The melt shop may conveniently be served by a pair of scrap delivery conveyors longitudinally bracketing the primary melting furnaces, each delivery conveyor leading from an outside scrap yard to an interior scrap delivery position within the primary melt area in the vicinity of a respective one of the primary melting furnaces. These conveyors may conveniently be scrap bucket cars on trackways running between the scrap yard and the interior scrap delivery positions.

In order to render compact the longitudinal extension of the single-aisle layout for the melting facility, the ladle transfer means (e.g. transfer car and trackway) overlaps longitudinally the downstream scrap delivery conveyor. At its downstream termination, the trackway may also overlap at least a portion of the ladle stocking location just upstream of the ladle metallurgical refining facility. The layout used for the primary melting furnaces and refining facility, and associated support and peripheral equipment, and the caster is, according to one aspect of the invention, a single-aisle layout in which all of the major equipment is aligned generally longitudinally along the long dimension of the layout. According to a preferred layout design, some of the support equipment in the melt shop is arranged to lie in parallel in overlapping longitudinal dimension so as to facilitate a compact arrangement of relatively low longitudinal dimension.

The two primary melting furnaces are preferably arranged in close side-by-side relationship, one being located longitudinally upstream of the other. The scrap delivery for the furnaces preferably comprises a pair of longitudinally spaced trackways supporting scrap delivery carriages (cars) on which incoming scrap buckets travel from an external scrap supply area into the melt shop. The interior terminal of each of these scrap delivery means is preferably located close to a discrete one of the furnaces, so that the two scrap delivery trackways bracket the two primary melting furnaces. Placing the trackways in this manner facilitates access of the trackways to separately located scrap supply areas outside the melt shop.

A ladle transfer trackway preferably extends longitudinally from the upstream primary melt furnace past the downstream primary melt furnace to a holding position outside the primary melt area. The trackway supports a ladle carriage that is able to pass underneath the tapping position of either primary melt furnace and thence to the holding position. At the holding position, an overhead crane can hoist the ladle and transport it to the ladle metallurgical refining facility or elsewhere. A stock or inventory of such ladles full of molten steel can be kept in a stacking area upstream of or close to the refining facility for reasons to be developed below. Desirably, the longitudinal location of the ladle transfer trackway overlaps that of the downstream scrap bucket delivery trackway so as to facilitate a compact longitudinal arrangement of the equipment. Of course, these two facilities do not overlap transversely. The object is to reduce the longitudinal dimension (so as to reduce the capital cost) whilst maintaining the convenience of a longitudinal layout.

The invention can be used in conjunction with other melt shop features described herein with the objective not only to reduce the capital cost of the melt shop as described but also to reduce operating expenses, particularly energy costs, by suitably designing and selecting both the plant layout and the energy-consuming equipment to be used in the melt shop.

The above description is of a minimum installation according to the invention. Obviously what has been described with reference to a pair of twinned primary melting furnaces and a pair of twinned refining facility stations could be doubled (say) to achieve comparable results on a larger scale.

DETAILED DESCRIPTION WITH REFERENCE TO THE DRAWINGS

For convenience, the following description covers not only the present invention but also inventions described and claimed in parent U.S. patent application Ser. No. 08,351,693.

Figure 1:
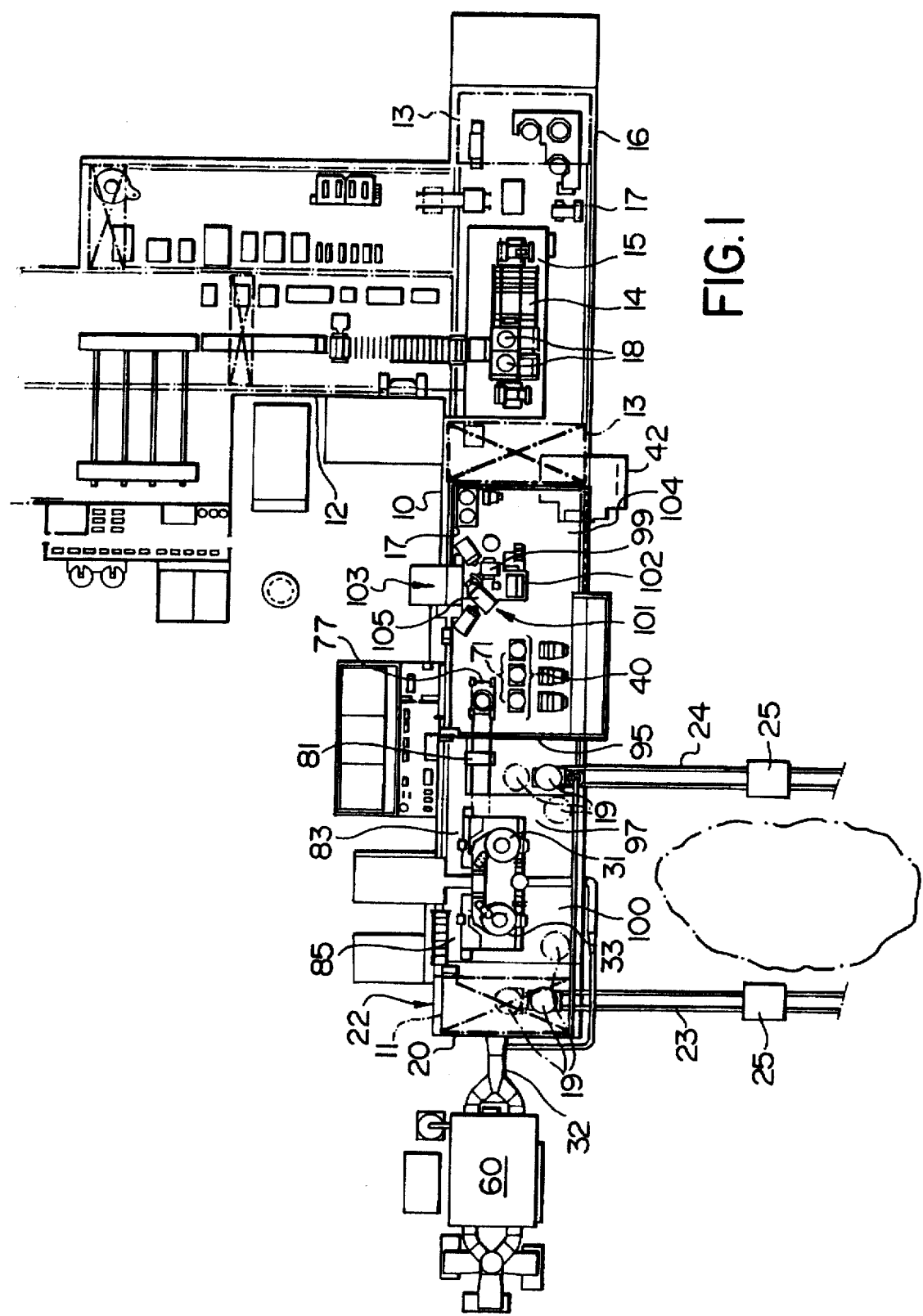
FIG. 1 is a schematic plan view of a melt shop layout constructed in accordance with the principles of the present invention.
Figure 2:
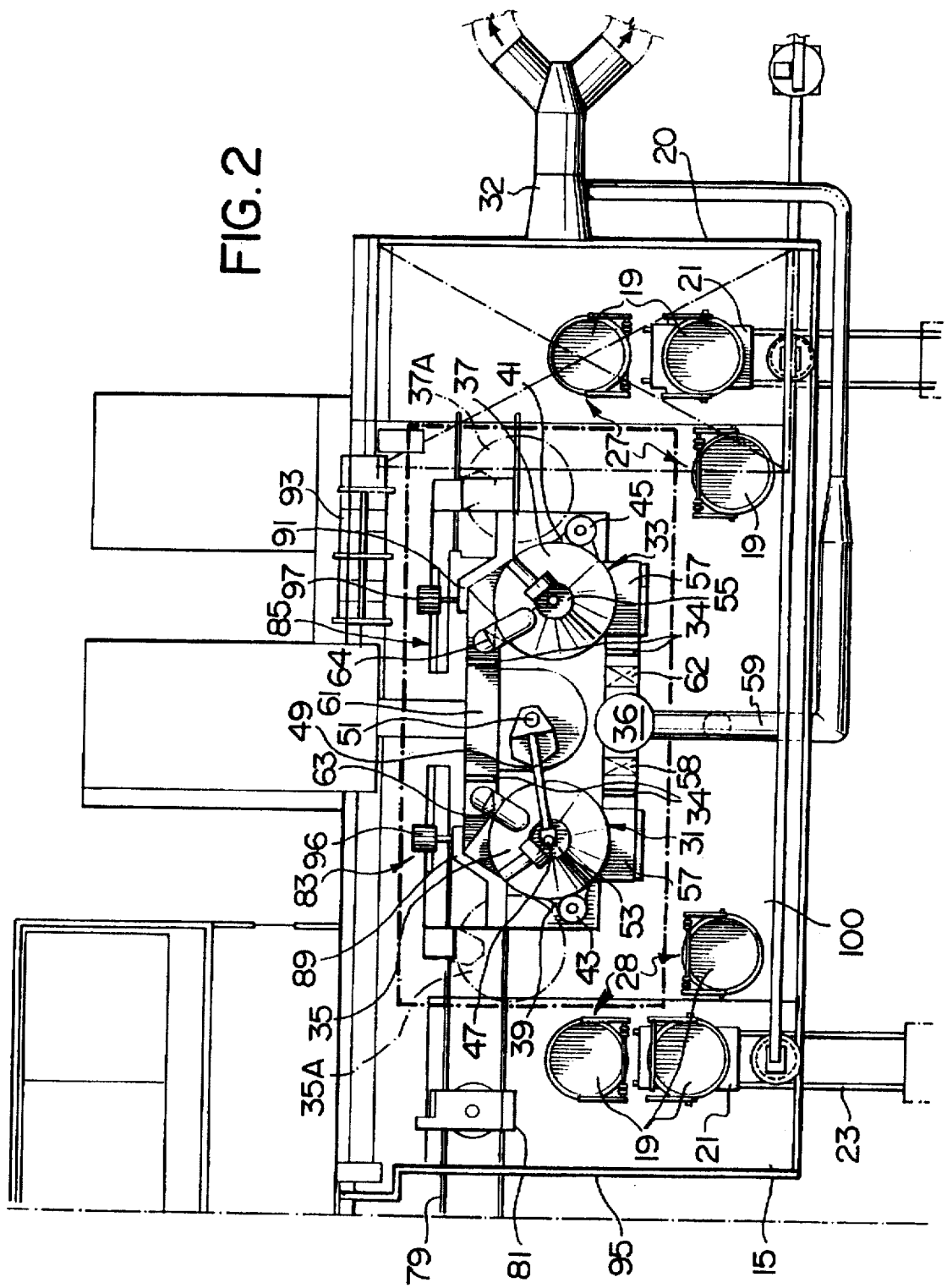
FIG. 2 is a schematic plan view of a mirror image of the primary melt facility forming part of the melt shop of FIG. 1 constructed in accordance with the principles of the present invention, on a minimum installation basis.

The melt shop generally indicated as 10 illustrated in FIG. 1 comprises an elevated primary melt area 100 installed generally on one horizontal level of a steel mill. The primary melt area 100 is shown in more detail in FIG. 2, in mirror image of the area illustrated in FIG. 1. Obviously the left-right orientation of the items of equipment illustrated in FIG. 1 is arbitrary; the orientation could have equally well been reversed, as FIG. 2 illustrates. Immediately beside the primary melt area 100 and atmospherically isolated therefrom (except for human passage and the passage of ladle transfer cars) by a barrier wall 95 and at a lower horizontal level (typically ground level) is a refining area 102 and, at the same level as refining area 102 (or conceivably at a still lower level), a ladle operations area 104; these last two areas are shown together in more detail in FIG. 3.

Near the downstream end 16 of the ladle operations area 104 a caster 14 is located on elevated caster platform 15; the tundish (not shown) for the caster 14 would be located immediately underneath the two ladle pouring stations 18 located above the melt shop floor level and shown adjacent the caster 14. A caster runout building 12 adjoins the melt shop 10 at a lower level with a longitudinal orientation generally transverse to the longitudinal orientation of the melt shop 10.

The melt shop 10 is shown as having a single-aisle longitudinal extension from its upstream end 20 to its downstream end 16. At the upstream end, a pair of longitudinally spaced scrap bucket trackways 23, 24 supply scrap steel to the melt shop from a location external to the melt shop. The scrap bucket delivery may be at a level selected to be suitable from both an interior and exterior point of view relative to the melt shop, but would normally be expected to be at ground or pit level (the lowest level of location of equipment and operations).

The melt shop is provided with a pair of travelling overhead cranes 11, 13 (schematically identified by broken-line rectangles with broken-line diagonals, the crane 13 being shown in two of its various possible positions) that are able to travel longitudinally along a single common pair of transversely spaced rails 17 longitudinally extending along the melt shop at pit level. Preferably the equipment layout within the melt shop is arranged to be accessible to either of the travelling cranes 11, 13 so that no additional cranes are required within the melt shop. Further, the location of the caster 14 in alignment with the main equipment in the melt shop 10 and within the service area of the cranes 11, 13 enables the crane 11 or 13 to service the caster 14 as well as equipment within the melt shop. Either crane 11, 13 is capable of performing any of the tasks assigned to a hoist or crane, but typically the crane 11 is used to charge primary melting furnaces 31, 33 with scrap, whilst crane 13 works primarily with ladles downstream of the primary melt area.

Scrap buckets 19 are removably carried on carriages 21 movable along trackways 23, 24 to carry scrap metal from an external scrap yard 25 to interior upstream and downstream charging positions 27, 28 that may also serve as pre-charging holding positions. The crane 11 hoists a scrap bucket 19 full of scrap off its associated car 21 and moves it to a precharging holding position. 27, 28 near one of the arc furnaces 31, 33 from whence it can be moved over and its scrap content dumped into the primary melt furnace (31 or 33) scheduled next in sequence to receive a charge.

The primary melting furnaces 31, 33 are two in number in a minimum installation. Each of the furnaces 31, 33 is provided with a removable roof, that for furnace 31 being shown in closed position by reference numeral 35, and in open position in phantom as 35A. The roof 37 for furnace 33 is shown in closed position, and in open position in phantom as 37A. It will be seen that the opening and closing of these roofs is made possible by means of the pivoting of support arms 39, 41 respectively, about a supporting mast (43, 45 respectively) so that the roofs for the furnaces can pivot between open and closed positions.

A consumable electrode 47 is vertically oriented and mounted on electrode support gantry 49 that is pivotally mounted for horizontal pivotal movement on a support mast 51 positioned equidistantly between the furnaces 31, 33. The pivoting arrangement enables the electrode 47 to be pivoted away from furnace 31 (the position that it occupies as illustrated in FIG. 1), so that it may be selectably inserted instead into furnace 33. Roof apertures 53, 55 are provided in roofs 35, 37 respectively to enable the electrode to penetrate into the furnace interior to melt a charge of scrap within the furnace into which it penetrates. A conventional mechanism (not shown) can raise and lower the electrode 47 as required to permit it to be advanced into the scrap as the electrode is consumed, and to permit it to be retracted so that the support arm 49 can toggle the electrode 47 from one furnace to the other. Such means of moving the electrode vertically may be of conventional design and is not per se part of the present invention.

While a single DC electrode 47 has been illustrated, it is to be understood that, if desired, AC primary melting could instead be devised, in which case a trio of AC electrodes operating with a three-phase AC supply could be substituted for the single DC electrode 47 illustrated.

After melting, the steel obtained from a charge occupies only a fraction, (typically about ⅕th) of the volume of the charge of scrap required to produce the molten steel. Consequently, more than one charge (typically two charges) are required in succession to be melted before there is enough molten steel available within either of the primary furnaces 31, 33 to fill a ladle when tapped. The charging/melting sequence, therefore, is to position electrode 47 first (say) within furnace 31 whose charge of scrap is then melted. In the meantime, the roof 37 of furnace 33 is opened to permit the overhead crane 11 to charge furnace 33 with a fresh charge of scrap to be melted. For this purpose a scrap bucket 19 is removed from its support carriage 21 and then hoisted by the crane 11 in position over the furnace 33. Then the bottom of the scrap bucket 19 is opened to permit the charge to fall into the furnace 33. The roof 37 is then replaced in position over the furnace 33 (assuming that one bucket of scrap is sufficient to fill the furnace) and that furnace remains idle until the charge of scrap in furnace 31 has been melted. When the charge within furnace 31 has been melted, the electrode 47 is transferred for operation to furnace 33, and melting of scrap begins in the furnace 33. In the meantime, a second charge of scrap metal can be added to furnace 31. After the charge in furnace 33 has been melted, the electrode 47 is re-transferred to furnace 31 and the remaining charge in furnace 31 melted, at which time, according to the design capacity of the furnace, enough molten steel is present within the furnace 31 that the furnace can be tapped and a ladle can be filled. After a ladle has been filled, the furnace 31 is recharged with a fresh load of scrap, and the cycle repeats.

The barrier wall 95 together with the adjoining walls surrounding the primary melt area (generally indicated as 22 in FIG. 1) form an enclosure (indicated schematically as 111 in FIG. 5) from which airborne effluent gases (offgases) are drawn by means of an exhaust hood 113 and collector duct 32 of conventional design to baghouse 60 located exterior to the upstream end 20 of the melt shop 10. Additional exhaust ductwork represented (FIG. 5) by fragmentary duct 117 and additional exhaust fans, etc. (not shown) may be provided as desired. The primary melt area 100 is thus closed off by the walls 22 and 95 so as to contain the melt shop atmosphere. Barrier wall 95 should preferably be a movable partition that can be opened to permit either of the overhead cranes 11, 13 (and their cargo) to pass between the primary melt area 100 and the ladle operations area 104.

Figure 5:
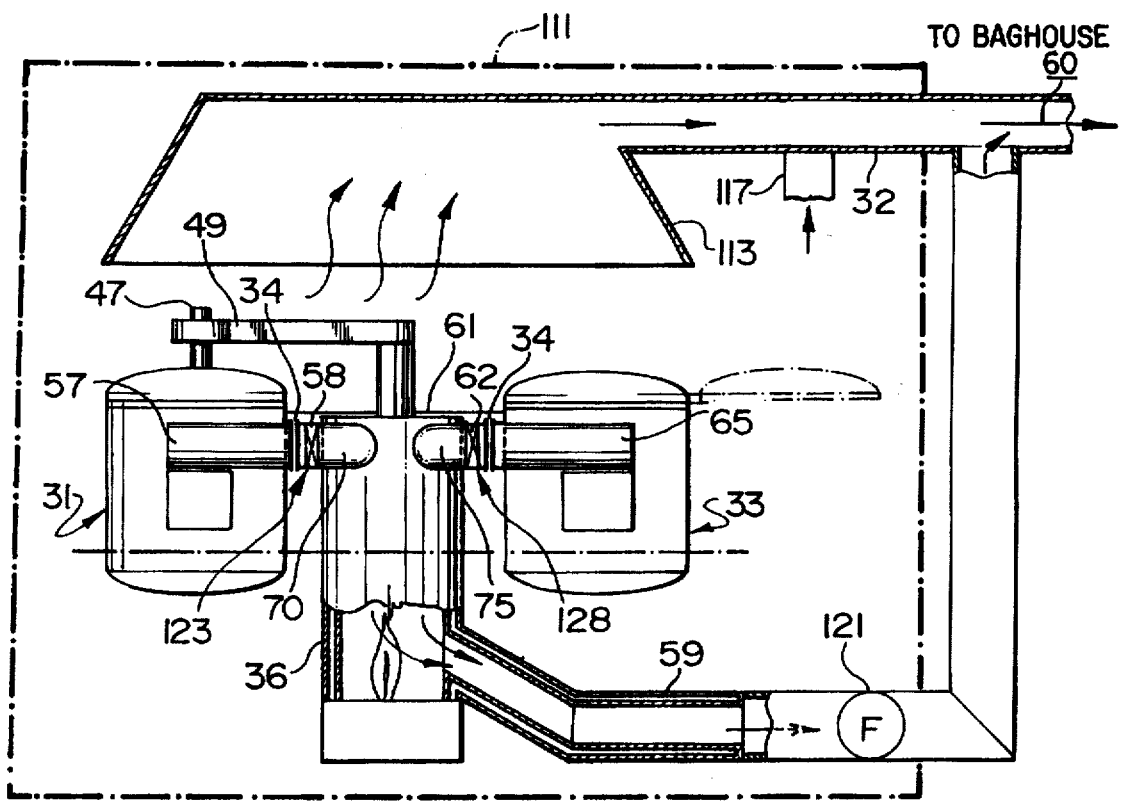
FIG. 5 is a schematic side elevation view of the offgas ducting and valve control for each of the primary melting furnaces of FIG. 2.

Each of the furnaces 31, 33 is provided with an exhaust offgas duct or manifold 57, 65 respectively leading via an associated collector duct 123,128 to afterburner or combustion chamber 36 (see FIG. 5). Within the ducts 70, 75 are damper valves 58, 62 respectively each operable to open or close the connection between the associated manifold 57, 65 and the associated collector duct 70, 75 leading to a combustion chamber 36. Further combustion of the offgas occurs in combustion chamber 36, resulting in a cleaner effluent therefrom, which effluent is directed via exhaust duct 59 assisted by fan 121 and thence to baghouse 60 for the collection of any remaining dust and debris. Note that the combustion chamber 36 may be supplied with a gas flame to ignite any combustible gases remaining in the offgas, of which carbon monoxide is likely to be the most prevalent combustible gas. This serves to eliminate or at least minimize the risk of an explosion in the baghouse 60. More than one such combustion chamber may be provided if desired. If it is found that there is a lot of combustible matter in the offgas, the combustion within combustion chamber(s) 36 could be used to provide auxiliary heat for use elsewhere, for example in additional preheating of the scrap in an optional preheat chamber (not shown) prior to its introduction into one of the primary melting furnaces, or to make steam.

Figure 4:
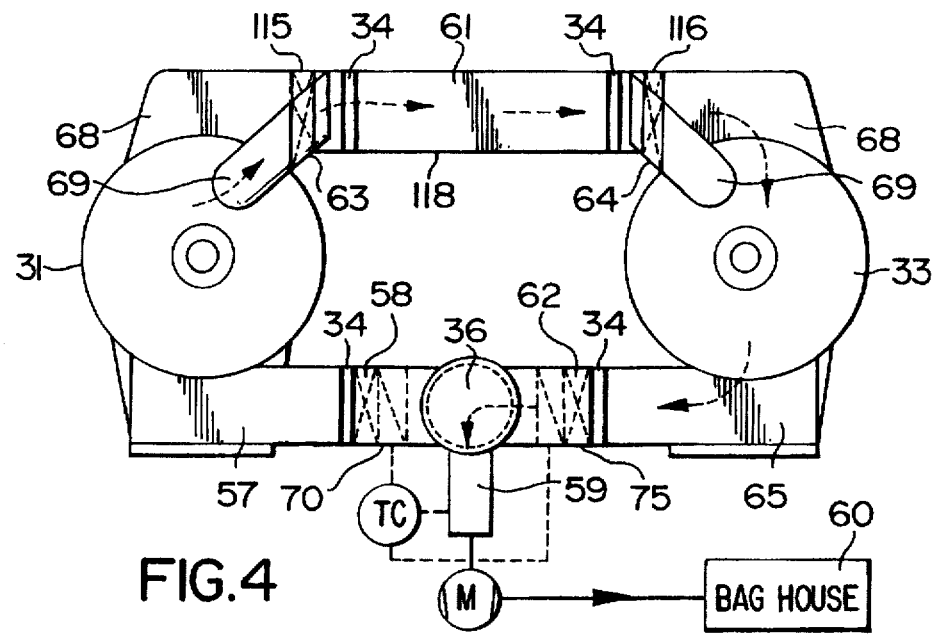
FIG. 4 is a schematic diagram of the offgas ducting and valve control therefor, for the primary melting furnaces of FIG. 2.
Figure 6:
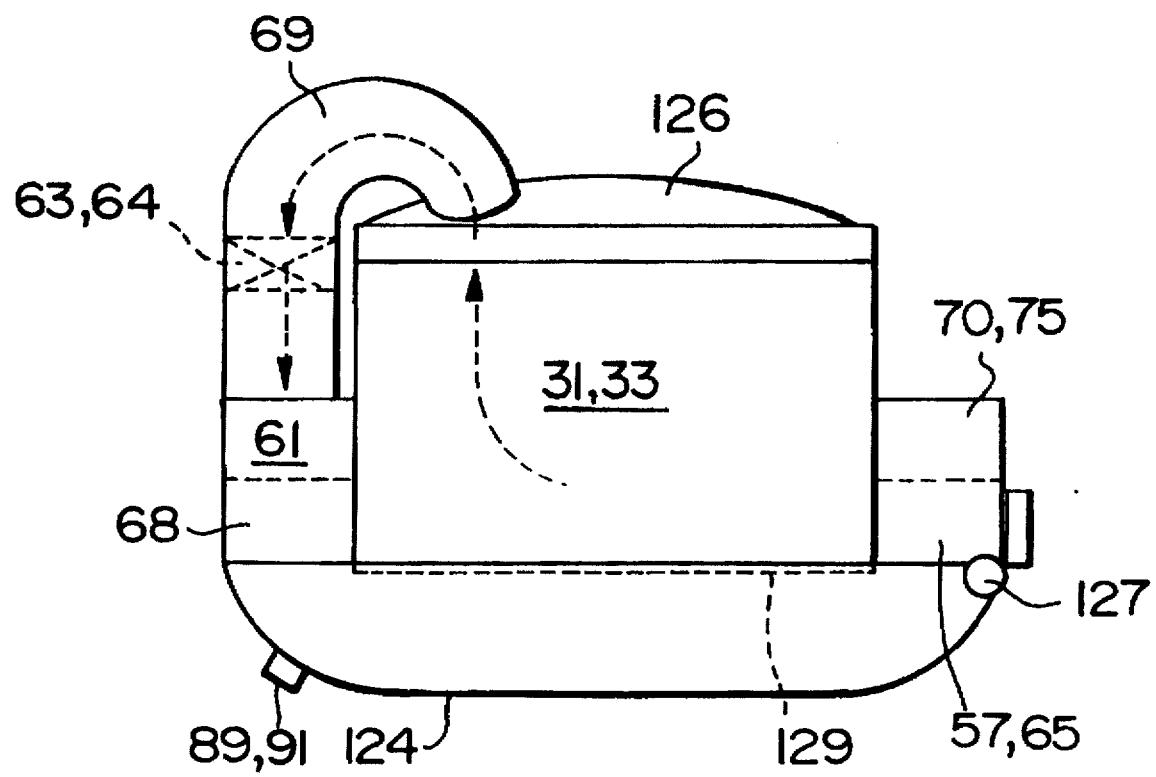
FIG. 6 is a schematic end elevation view of one of the primary melt furnaces of the melt shop of FIGS. 1 and 2, showing schematically the associated offgas ductwork.

Between furnaces 31 and 33 there is an offgas transfer duct 61; see FIG. 4. The transfer duct 61 comprises a central fixed duct 118 separated by break flanges 34 from end manifolds 68 directly coupled to and moving with their respective associated furnaces 31, 33. Damper valves 115, 116 at the ends of manifolds 68 in the vicinity of break flanges 34 are operable to open or close the manifolds 68 to the central duct 118. Note that the manifolds 68 are located toward the bottoms 124 of their respective furnaces 31, 33 (see FIG. 6). From the tops 126 of each of the furnaces 31, 33, an offgas collector elbow duct 69 leads via an associated damper valve 63, 64 to the transfer duct 61. Damper valves 63, 64 are operable to open or close elbow ducts 69 to transfer duct 61. Additional booster fans (only one exemplary fan 121 is shown) may be provided for efficient offgas flow.

At the beginning of the operating cycle of the furnaces, the furnace 31 (say) is charged with scrap, the cover 35 (FIG. 1) replaced atop the furnace 31, the electrode 47 (FIG. 1) inserted into the scrap charge, and electric current applied, whereupon melting of the scrap charge in furnace 31 begins. At that time, dampers 62, 63, 64, 115 and 116 are closed and damper 58 is open so that the only exhaust available from furnace 31 is via manifold 57 and duct 70. Once the idle furnace 33 is charged with scrap and its cover 37 (FIG. 2) repositioned over the furnace 33, dampers 115 and 64 and consequently transfer duct 61 are opened. Damper 62 is now opened to permit offgas to exit via exhaust duct 75, while exhaust duct 70 is closed by means of damper 58, so that the offgas from furnace 31 is directed through the charge of scrap in furnace 33, and thence to exhaust duct 75 that is open to pass the offgas to combustion chamber 36, thence to collector duct 59, and thence to the bag house 60.

As offgas passes from the transfer duct 61 into the interior of furnace 33, the velocity of the offgas drops off quickly because of the large volume available to its passage through furnace 33, as compared to the volume of the duct 61, and, consequently, dust and debris have an opportunity to settle out within the furnace 33. Further, the charge of scrap within the furnace 33 serves as a filter or collector for dust and debris, and also tends to remove dust and debris from the offgas. The offgas, less a substantial portion of the dust and debris that it originally carried, then passes via manifold 65, duct 75, combustion chamber 36, and duct 59 to the bag house 60. This mode of operation reduces the amount of dust and debris sent to the bag house and, therefore, increases the time interval required for emptying the bag house, thereby lowering the operating costs. Further, some of the dust and debris that settles within the furnace 33 comprises iron and alloying materials and, consequently, constitutes a useful addition to the melt within furnace 33 when melting begins in that furnace. Further, the charge of scrap within furnace 33 is pre-heated by the passage of the offgas from furnace 31 through the charge of scrap within furnace 33, thereby reducing the energy requirement for melting the scrap within furnace 33.

The above cycle is repeated in mirror image for the scrap melting cycle of furnace 33. While furnace 31 is charged with a second load of scrap, offgas from furnace 33 (now actively melting its charge of scrap) flows only via exhaust duct 75, combustion chamber 36 and collector duct 59 to the baghouse 60. After furnace 31 is fully charged, awaiting its turn to resume melting, exhaust duct 70 and common transfer duct 61 are reopened and exhaust duct 75 closed so that the offgas from furnace 33 is forced to pass through the fresh charge of scrap in furnace 31. This requires that damper valves 58, 64 and 115 be open while damper valves 62, 63 and 116 are closed.

All of the offgas ducts and manifolds in the vicinity of the furnaces are water-cooled to prevent excessive temperatures from building up and to permit the gases to cool to a temperature at which normal ducting (not water-cooled) can be safely used. Normally the offgas is mixed downstream with ambient air before entering the baghouse 60.

The various damper valves 58, 62, 63, 64, 115, 116 are desirably located close to the furnaces, rather than removed from the furnaces, so that dust and debris have little tendency to settle within the ducts 61, 70, 75 when a given damper is closed. All of the damper valves 58, 62, 63, 64, 115 and 116 are water-cooled; they may be of conventional design. Break flanges 34 are arranged at suitable locations along the various ducts to enable the furnaces 31, 33 to tilt (pivot) when tapped without fracturing the ducts. Note also that the furnace shells are pivotally openable about pivot 127 (FIG. 6) along break line 129.

Desirably, the manifolds 68 are located at a relatively low level to permit transferred offgas to preheat a charge of scrap more efficiently than would be possible if these manifolds were located higher up in each furnace. However, the connecting elbows 69 are preferably coupled to furnaces 31, 33 respectively at or near the tops of the furnaces so that as much dust and debris as possible may settle out before the offgas is exhausted via one of these elbows. Note that the manifold 68 is located generally opposite the location of manifold 57, 65 within an associated furnace 31, 33. The location of the manifold 57, 65 generally opposite the transfer manifold 68 facilitates the settling of incoming dust and debris out of the incoming transferred offgas and onto the furnace floor.

A potential disadvantage of the foregoing arrangement is that gases and dust en route to combustion chamber 36 are cooled by passage through the idle furnace before reaching combustion chamber 36. This cooling may result in incomplete combustion in chamber 36, increasing the risk of environmental contamination by effluent gases passing out of the baghouse 60. To some extent, the problem can be circumvented by separately preheating the idle furnace during the first few minutes of passage therethrough of the offgas from the active furnace, but this diminishes the benefit of using the foregoing offgas preheating arrangement. If environmental regulations are particularly strict, it may not be possible to use the offgas preheating proposal herein described.

Ladles 71 are shown in a stacking or holding area 40 (FIGS. 2 and 3) while awaiting pre-heating and filling. A trio of ladles 71 are shown at a ladle slide gate repair and pre-heating station 73. Typically, ladles during slide gate repair and pre-heating are placed on their sides, and are given any necessary repairs prior to pre-heating. The slide gate (not shown, of conventional design) that controls the flow of metal out of the ladle and into the tundish for casting, is that part of the ladle that tends to need the most maintenance, and frequently requires repair prior to pre-heating of the ladle. Once in proper repair, ladles may be pre-heated by suitable gas burners or the like in readiness for filling.

Ladles 71 are moved from position to position by means of overhead crane 13. Just prior to filling, an individual preheated ladle 71 is placed by the crane 13 on a ladle car 77 movable along a trackway 79 that leads from a rest or holding position 72 to a final pre-heat station 81 immediately prior to tapping the primary melt furnace. At the pre-heat station 81, sand is poured over the slide gate port of the ladle 71 (not shown, of conventional design) to prevent steel from freezing in the vicinity of the ladle outlet port. The carriage 77 is then moved along track 79 to a position 83 or 85 (depending upon which of the furnaces 31, 33 is ready for tapping) and the furnace is emptied via its outlet port 89 or 91, as the case may be.

Alloying agents in quantity may be added directly to furnaces 31, 33 using a suitable loading vehicle (not shown) that obtains quantities of alloy from alloy bunkers 93. Alloys may also be added to the ladle being filled via bulk additive chutes 96, 97 (as the case may be) each of which is pivotal about a vertical axis to swing over or away from a ladle being filled by the furnace, so that alloys may be added directly to the ladle.

Figure 3:
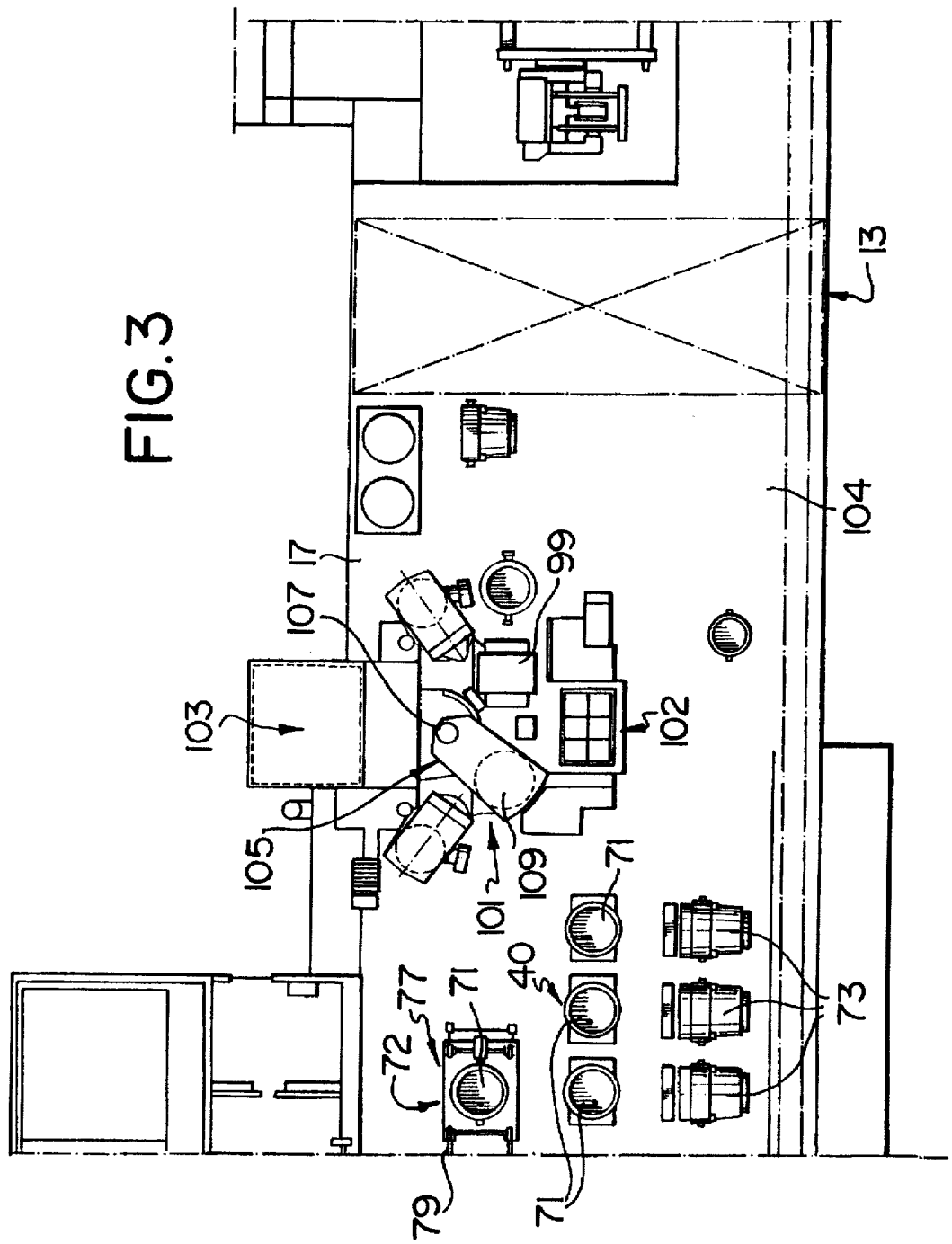
FIG. 3 is a schematic plan view of the refining and ladle facility forming part of the melt shop of FIG. 1 constructed in accordance with the principles of the present invention, on a minimum installation basis.

Once a ladle 71 has been filled, it is removed from its position underneath the melt furnace outlet, and reassumes rest position 72 in the vicinity of the right-hand end of track 79 as seen in the drawings. At that point, the crane 13 may hoist the ladle 71 directly to ladle position 99 or 101, these being the two ladle positions within a ladle metallurgical refining facility generally indicated as 103 (FIG. 3). Alternatively, a freshly filled ladle may be temporarily stored in a heated holding or stacking area 40 (FIGS. 2 and 3), if both positions 99 and 101 are occupied, or if it is desired to build up an inventory of filled ladles before commencing metallurgical refining in refining facility 103.

Refining facility 103 is shown as including a pivotally mounted electrode support arm 105 that pivots about a support mast 107. Electrode support arm 105 supports a trio 109 of AC electrodes removably immersed in a ladle of molten steel and through which three-phase alternating current flows for further heating of the contents of the ladle into whose liquid steel contents the electrodes are inserted. The refining facility 103 thus operates between two stations, the ladle positions 99 and 101 constituting the pair of available refining operating positions or stations. During the metallurgical refining process, argon gas may be bubbled through the molten steel, and final trim alloys may be added in conformity with conventional metallurgical refining techniques. For simplification, alloy additive chutes, etc. conventionally associated with such refining facility are not shown on the drawing.

When the tundish (not shown) is ready to accept molten steel from a ladle for feeding the caster 14, the electrodes 109 are removed from the ladle, which can then be positioned over the caster 14 in one of the pouring positions 18 and tapped to supply molten steel to the tundish in conformity with conventional practice. At that time the electrode support arm 105 is swung out of the way and over the other of the two ladle stations 99, 101 at the refining facility 103, following which refining of the contents of that other ladle occurs. The AC electrodes are thus toggled between the two ladle positions 99, 101 as required for the series of refining operations.

Alternatively, the ladles after completion of the refining process may be set aside in stacking area 40 or elsewhere for pouring at a later time. During the holding period, they are kept covered and insulated to avoid excessive heat loss.

Note that the equipment layout as thus far described facilitates an orderly and convenient performance of the required series of operations within the melt shop. Steel progresses from scrap to refined molten steel ready for casting generally longitudinally from scrap input to the primary melting furnaces, thence to the refining facility stations, and thence to the caster. Longitudinal dimensions can be selected to be a minimum. All equipment can be served by one or other of the overhead cranes 11, 13. The overlapping in the longitudinal sense of selected items of equipment can facilitate a compact layout. Such overlapping includes, in the exemplary layout illustrated, part of the ladle transfer trackway 79 with the preheat and stacking areas 40, 73, and with downstream scrap bucket trackway 24. A compact layout is also facilitated by the twinning of the furnace pairs 31 and 33 and by twinning the refining stations 99 and 101 in close proximity, with each twinned pair having, as a pair, generally longitudinal orientation. Further efficiency of layout is obtained by aligning the caster 14 in generally longitudinal alignment with the other major items of equipment within the melt shop.

It would be possible to provide each of the furnaces 31 and 33, and the two operating stations 99, 101 of refining facility 103, with a discrete electrode or set of electrodes so that toggling of electrodes would not be required. This could be more convenient for some purposes, and would (if a booster power supply were also made available) permit higher primary melt furnace output to meet peak caster demands. However, it would add at least several million dollars to the capital cost of the installation. Equally, it might conceivably be possible to provide more than two operating stations per electrode or per electrode set, although this possibility appears unlikely to be attractive.

If desired, an optional vacuum degasser station 42 may be provided for degassing of ladles of molten steel prior to casting.

Because the primary melting furnaces 31, 35 require significantly more time to melt enough steel to fill one of the ladles than the refining facility 103 takes to refine the contents of a ladle, it follows that the throughput possible through the refining facility is significantly higher than the output of the primary melting furnaces. One way to balance the two would be to double the number of primary melting furnaces so that a continuing supply of molten steel could be provided by the primary melting furnaces to the AC refining facility. This solution to the problem, however, would double the capital expenditure for the primary melting furnaces, thereby significantly increasing the cost of manufacture of a ton of steel, and also increasing the peak electrical load required, which would significantly increase energy costs. Further, during production of narrower widths of cast slabs, there would be unacceptable overcapacity.

According to the present invention, the imbalance between the AC throughput capacity and the primary melt output capacity is obtained by suitably sequencing the series of melts ("heats") so that a continuing supply of at least about 8 (if needed) and as many as approximately 16 heats (if needed) can be prepared and poured into the caster for continuous casting purposes.

To this end, it is proposed according to the invention of copending U.S. patent application Ser. No. 08/361,693, field on Dec. 8, 1994, to provide in inventory a number of ladles of steel containing molten metal (preferably superheated) that are set aside before refining or set aside after refining and before pouring into the tundish, or both, and that casting is delayed until a sufficient number of such heated ladles of molten steel have been prepared such that an adequate supply of steel can be provided to the caster (via the tundish) throughout an adequately long continuous casting process cycle. Ladles set aside may be further superheated and refined or poured two or more hours later.

The preferred scheduling of the use of the furnaces and of heats to be stacked in inventory will depend upon a number of factors, including the slab size to be cast, the total number of heats required to meet a customer's order, the ladle size, the transformer capacity, the maximum permitted temperature increase per minute in the active refining facility station, and possibly other parameters.

The melt shop designer will take into account the expected types of order that most customers will place, including the end product type and quantity, and will take into account the expected annual production of the steel mill. The melt shop should be designed to meet the most usual range of orders, and must be sufficiently flexible that the normal range of orders can be reasonably accommodated. The melt shop designer must also take into account the caster output speed in inches per minute and must design the melt shop with this value in mind.

A number of items of apparatus normally found in a melt shop and a number of the associated procedures have not been described in this specification because they are conventional in character and do not relate directly to any of the inventive subject matter described and claimed herein. For example, the melt shop would be provided with a ladle dump station, slag addition and disposal means, transformers and associated electric power supply equipment, testing stations, control rooms, lances for injecting oxygen into the melt, etc. in accordance with conventional melt shop practice.

The melt shop layout shown could be roughly doubled to obtain double production.

Variations within the scope of the invention will readily occur to those skilled in the art.

What is claimed:

1. In combination, a melting facility for a steel mill that accepts scrap iron and steel as an input and produces a molten steel output and a caster taking as an input the molten steel output of the melting facility and producing a cast slab output, wherein the melting facility is arranged in a longitudinally extending and spaced array in a single-aisle layout comprising the following components in spaced sequence:

a) at least a pair of longitudinally aligned and spaced electric arc primary melting furnaces;

b) a ladle metallurgical refining facility having at least a pair of longitudinally aligned and spaced operating stations; and c) at least one overhead crane transversely bracketing said furnaces and said refining facility and capable of longitudinal movement along the single-aisle layout of the melting facility;

wherein the caster is located in the vicinity of the downstream end of the ladle metallurgical refining facility and in longitudinal alignment with the components of the melting facility; and wherein the cast slab output of the caster extends at a selected angle to said longitudinally extending and spaced array.

2. The combination of claim 1, wherein each said primary melting furnace has an outlet port, and additionally including:

d) ladle transfer means for positioning a ladle selectably underneath the outlet port of each of the primary melting furnaces or to a holding station downstream of the primary melting furnaces but upstream of the ladle metallurgical refining facility; and e) a ladle stocking station in the vicinity of the ladle metallurgical refining facility.

3. The combination of claim 2, wherein the primary melt facility is atmospherically separable from the remaining portion of the melting facility and includes an exhaust venting system for the primary melting furnaces, and wherein the holding station for the ladle transfer means is located downstream and outside of the primary melt area.

4. The combination of claim 2, additionally comprising a pair of scrap delivery conveyors longitudinally bracketing the primary melting furnaces, and each having an interior scrap delivery position within the primary melt area in the vicinity of a respective one of said primary melting furnaces.

5. The combination of claim 4, wherein the scrap delivery conveyors each includes a trackway extending from the interior of the primary melt area transversely relative to the longitudinal single-aisle layout to a loading area external of the melting facility, and a carriage moveable between the external loading area and the interior delivery position and removably carrying a scrap bucket for delivery of scrap metal to one of said primary melting furnaces.

6. The combination of claim 4, in which, in order to render compact the longitudinal extension of the single-aisle layout for the melting facility, the ladle transfer means overlaps longitudinally the downstream scrap delivery conveyors and at its downstream termination at least a portion of the ladle stocking location.

7. The combination of claim 1, wherein the caster receives the molten steel output of the melting facility via a tundish generally longitudinally aligned with the single-aisle layout of the melting facility.

8. The combination of claim 1, wherein the selected angle is of the order of 90 degrees.

9. In combination, a melting facility for a steel mill that accepts scrap iron and steel as an input and produces a molten steel output and a caster taking as an input the molten steel output of the melting facility and producing a cast slab output, wherein the melting facility is arranged in a longitudinally extending and spaced array in a single-aisle layout comprising the following components in spaced sequence:

a) at least a pair of longitudinally aligned and spaced electric arc primary melting furnaces, each said primary melting furnace having an outlet port;

b) a ladle metallurgical refining facility having at least a pair of longitudinally aligned and spaced operating stations;

c) ladle transfer means for positioning a ladle selectably underneath the outlet port of each of the primary melting furnaces or to a holding station downstream of the primary melting furnaces but upstream of the ladle metallurgical refining facility;

d) a ladle stocking station in the vicinity of the ladle metallurgical refining facility; and e) two overhead cranes each transversely bracketing said furnaces and said refining facility and each capable of longitudinal movement along the single-aisle layout of the melting facility, one of said cranes serving the primary melt area including scrap delivery to the primary melting furnaces, and the other of said overhead cranes serving the remainder of the melting facility;

wherein the caster is located in the vicinity of the downstream end of the ladle metallurgical refining facility and in longitudinal alignment with the components of the melting facility; and wherein the cast slab output of the caster extends at a selected angle to said longitudinally extending and spaced array.

10. The combination of claim 9, wherein the cast slab output of the caster extends generally perpendicularly to said longitudinally extending and spaced array.

11. The combination of claim 9, wherein each of said cranes is capable of longitudinal movement along substantially the entirety of the single-aisle layout of the melting facility.

\* \* \* \* \*

UNITED STATES PATENT AND TRADEMARK OFFICE
CERTIFICATE OF CORRECTION

PATENT NO. : 5,628,958
DATED : May 13, 1997
INVENTOR(S) : William R. Frank

It is certified that error appears in the above-indentified patent and that said Letters Patent is hereby corrected as shown below:

Col. 2, line 20, change "facility in" to --facility - in--.

Col. 6, line 57, delete "." after "position".

Col. 7, line 11, change "Fig. 1" to "Fig. 2".

Col. 7, line 29, delete "." after "fraction".

Col. 7, line 60, add " 100" after "area".

Col. 8, lines 48-49, change "(Fig.1)" to --(Fig. 2)--.

Col. 8, line 49, change "(Fig. 1)" to --(Fig. 2)--.

Col. 8, line 56, change "115 and 64" to --116 and 63--.

Col. 10, line 12, change "(Figs. 2 and 3)" to --(Figs. 1 and 3)--.

UNITED STATES PATENT AND TRADEMARK OFFICE
CERTIFICATE OF CORRECTION

PATENT NO. : 5,628,958
DATED : May 13, 1997
INVENTOR(S) : William R. Frank

It is certified that error appears in the above-indentified patent and that said Letters Patent is hereby corrected as shown below:

Col. 10, lines 54-55, change "(Figs. 2 and 3)" to --(Figs. 1 and 3)--.

Col. 11, line 60, change "35" to --33--.

Col. 12, line 17, change "field" to --filed--.

Signed and Sealed this

Twenty-third Day of September, 1997

*Attest:*

BRUCE LEHMAN

*Attesting Officer*  *Commissioner of Patents and Trademarks*